Dec. 31, 1946.  C. G. FOUND  2,413,442
ELECTRODE ACTIVATION
Filed Jan. 28, 1944  2 Sheets-Sheet 1
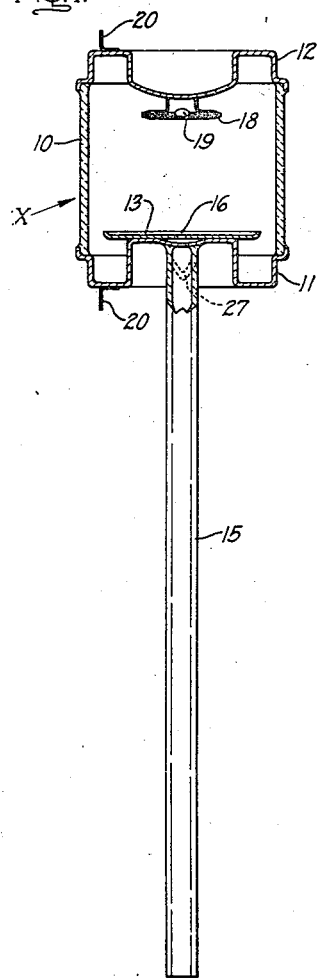
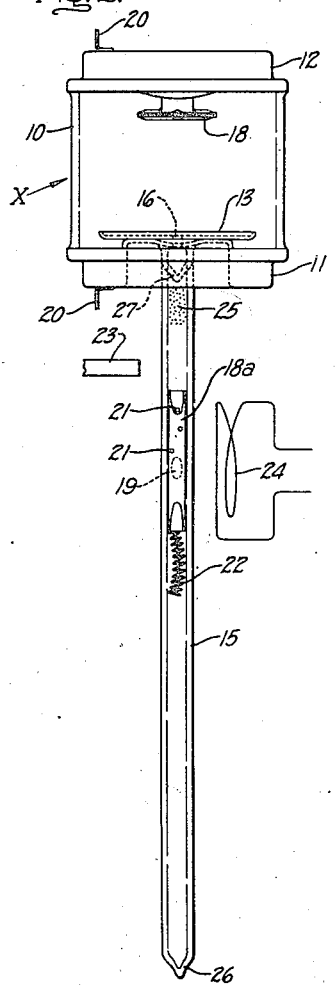
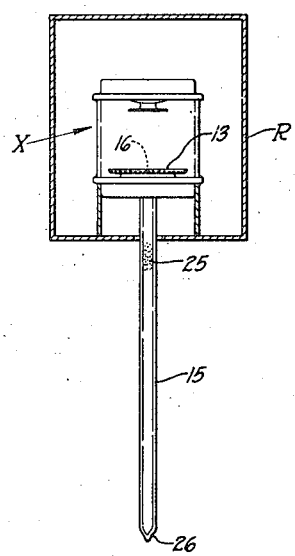
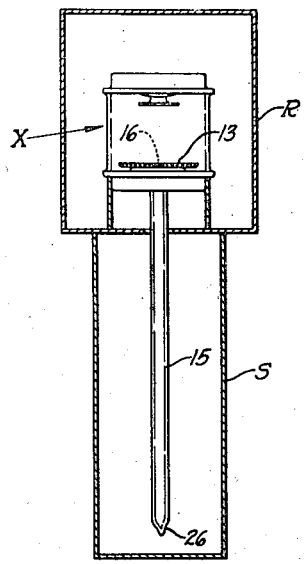
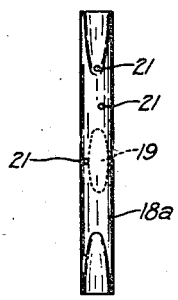
Inventor:
Clifton G. Found,
by John J. Anderson
His Attorney.

Dec. 31, 1946.    C. G. FOUND    2,413,442
ELECTRODE ACTIVATION
Filed Jan. 28, 1944    2 Sheets-Sheet 2

Inventor:
Clifton G. Found,
by John H Anderson
His Attorney.

Patented Dec. 31, 1946

2,413,442

UNITED STATES PATENT OFFICE 2,413,442

ELECTRODE ACTIVATION

Clifton G. Found, Cleveland Heights, Ohio, assignor to General Electric Company, a corporation of New York Application January 28, 1944, Serial No. 520,052

7 Claims. (Cl. 316—9)

This invention relates to the activation of electrodes of electric discharge devices, and especially to activation effected by matter in vaporous or suspended form that is introduced or liberated into a discharge device envelope to come in contact with an electrode to be activated. The liberation of such matter may take place after the initial evacuation of the discharge envelope, and matter thus disseminated in the envelope may also serve the purpose of a getter to clean up residual gas or vapor and improve the vacuum. The invention is here explained with particular reference to its employment in the manufacture of a simple type of photocell having a cathode surfaced with an antimony and caesium combination; but it will be understood that it is applicable to other types of discharge devices, such as electron multipliers, for example, as well as to other types of phototube besides those here illustrated. Likewise, it is applicable to electrodes surfaced with other combinations besides antimony and caesium, such as bismuth and caesium, antimony and rubidium, or any useful combinations of vaporizable first group metal with metal of the fifth group of the periodic system. Aside from the activation of the cathode surface with which the invention is specially concerned, the material, construction, or shape of the discharge device structure are broadly immaterial to the invention: e. g., it is just as applicable to photocells of spherical glass bulb type as to the tubular metal and glass cells here shown.

Various features and advantages of the invention will become apparent from the description of species and forms of embodiment, and from the drawings.

In the drawings:

Fig. 1 shows a vertical longitudinal section through a photocell device; Fig. 2 is a side view of the device showing additional features; and Fig. 3 is a side view of a capsule shown in Fig. 2, on a larger scale.

Figs. 4 and 5 are diagrammatic sectional views of ovens for the practice of my invention, with a photocell therein.

Figure 7:
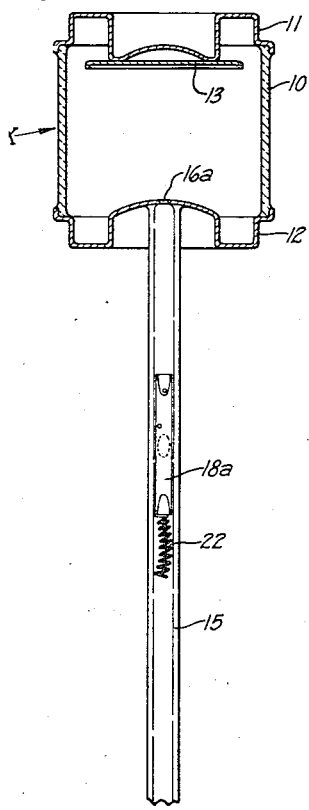
Figure 8:
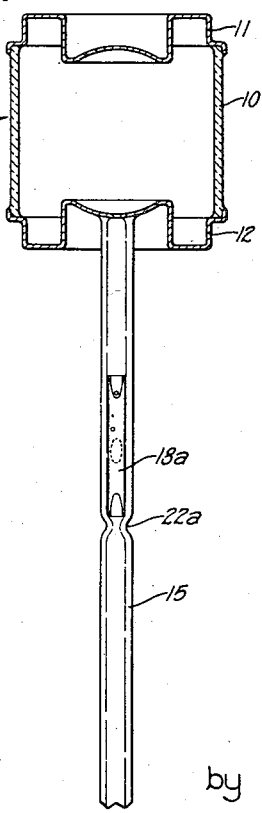
Figure 9:
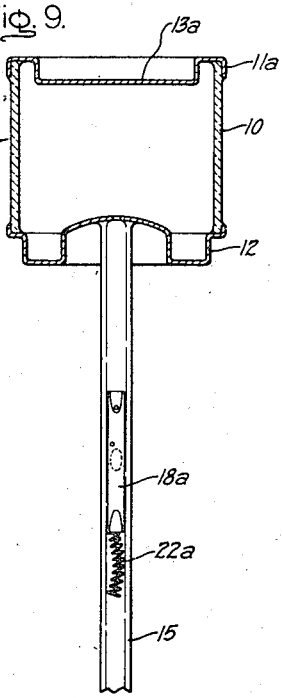

Figs. 7, 8, and 9 are views similar to Fig. 1 illustrating modifications of the cell construction.

A photocell device X is shown in Fig. 1 as comprising a short glass envelope tube 10 having its ends sealed by fusion to the margins of abutting annularly embossed discs or electrode headers 11, 12 of sheet metal (such as chrome iron or "Allegheny 55," as it is commercially known), generally similar to those used for the ends of the tubular incandescent lamps which are commercially known as "lumiline" lamps. The cathode header 11 which appears at the bottom in Fig. 1 carries a coaxial sheet metal cathode disc 13 (as of nichrome or nickel) welded thereto and shown with its outer edge turned up toward the anode header 12. As shown, a glass appendix or exhaust tube 15 is attached or sealed by fusion to the outer side of the centrally apertured header 11, substantially coaxial with its aperture and with a corresponding central opening 16 in the disc 13. The anode header 12 which appears at the top in Fig. 1 is not apertured, but carries a central sheet metal capsule or container 18 (as of nickel foil) in which is a charge or pellet 19 which yields metallic caesium vapor under heat, such as a well-known mixture of caesium chromate with silicon as a reducing agent. Current connections 20, 20 are shown welded to the headers 11, 12.

In the manufacture of the photocell device above described, the cathode disc 13 is welded to the header 11 and the tube 10 is sealed at one end to this header, the cathode disc 13 is surfaced with a thin coating of antimony thermally deposited thereon, the metal shell of the container 18 is welded to the header 12 and charged with its charge 19, and the header is sealed to the end of the tube 10, the glass tube 15 being also sealed to the header 11.

In processing a cell device X of Fig. 1 type as heretofore practiced, the device was baked and exhausted, and the caesium pellet 19 was "flashed" by heating the header 12 by means of a (hydrogen) gas torch, thus forming metallic caesium vapor and liberating and introducing it from the container 18 into the cell, which was at the same time cooled by air. This resulted in deposition of condensed metallic caesium on the glass walls and on the antimony-coated surface of the cathode 13, in an amount materially exceeding what was needed. The cell was then heated in an oven to a sufficient temperature to revaporize the excess caesium and drive it out of the photocell X via the tube 15, after which the cell was tipped or sealed off short from the tube 15 as indicated in heavy dotted lines, leaving the resulting exhaust tip 27 sheltered in the central cavity in the header 12.

The nature of the reaction between the caesium and the antimony on the cathode 13 is not definitely known. One opinion is that an alloy or chemical compound $SbCs_3$ is formed; another is that the reaction is less profound than this, and results in the formation of some less intimate complex or combination of caesium and antimony—possibly rather physical than chemical. What I have found to be important, however, is that adequate heat is required to bring the caesium and antimony into the relation or combination that gives the cathode its desired properties for operation of the photocell; that an excess of caesium relative to the amount of antimony is objectionable in the completed photocell; and that considerable heat is required to vaporize and expel the excess caesium. Furthermore, the temperature necessary to accomplish this in a reasonable length of time tends to impair the quality of the active caesium-antimony surface that has been formed. On the whole, the caesium-antimony reaction effected as just described is uncertain and capricious to such a degree that many photocells fail to exhibit the required properties to an acceptable degree.

I have found that this uncertainty of the reaction can be obviated by controlling separately the temperature of the antimony-surfaced cathode and the vapor pressure and supply of caesium available for deposition on the antimony surface and reaction with it, instead of leaving both these factors to be controlled together by the general temperature of the photocell X, as was the case in the prior practice above described. It thus becomes possible to produce cells of superior quality, functional capabilities, and uniformity. For example, while the average sensitivity of acceptable photocells produced by the old method was about 30 to 35 microamperes per lumen, that of cells produced according to my invention runs about 55 to 65 microamperes per lumen or better; while a considerable number of the old cells failed to show the required low uniformity ratio of 1½ (the uniformity ratio being the ratio between the sensitivity of the most sensitive quadrant of the cathode surface and that of its least sensitive quadrant), 90 per cent of the new cells produced according to my invention show a uniformity ratio lower than 1¼; the gas content of my new cells is much lower; and they are more stable in that their sensitivity falls off much less during storage in the dark.

For the purposes of this invention, it is preferred to introduce caesium into the cell X from or via the tube 15, rather than from a container 18 within the cell; nevertheless, the presence of the empty container 18 in the cell X as shown in Fig. 2 is not objectionable. As shown in this figure, the caesium-yielding charge 19 is initially placed right in the tube 15 itself, somewhat below the cell X, and the container 18a that actually holds the charge has the form of a sheet metal capsule or cartridge made of a short length of nickel foil tubing having its ends pinched shut to retain the charge, but presenting opening(s) 21 at or near its upper end to permit escape of the caesium vapor when the latter is generated in it, all as shown in Fig. 3. This capsule 18a may be made small enough not to block or stop up the tube 15, and is shown at a spatial interval from the cell X. To assure that the capsule 18a shall remain in the desired position in the tube 15, a fixed support may be provided for it, such as a stiff helical (nickel) wire coil spring 22 bent crooked and then inserted in the tube 15 to the position desired, where it is held by its resilient pressure and friction against the tube walls, without obstructing the passage through the tube.

In processing a cell X according to this invention, the device may first be baked and exhausted in an oven (not shown), as in the old process, being thus brought to a temperature of the order of 300 to 340° C. The device having come hot out of this exhaust oven, jet(s) of cooling air from one or more nozzles 23 may be blown on the tube 15 to cool it, especially around and above the capsule 18a; and while the tube 15 is being thus cooled, the capsule 18a and its charge 19 may be heated by high-frequency induction, by means of a coil 24 placed close to the tube 15, thus flashing the charge 19 and depositing condensed caesium in the tube 15 above the capsule 18a, as indicated by stippling at 25, without its entering the cell X to any material extent, and without heating the tube 15 sufficiently to risk cracking it. The tube 15 may then be sealed or tipped off long at 26 as shown in Fig. 2. The caesium being thus isolated in the tube 15 at some distance below the photocell X, the cathode 13 may then be activated by driving a sufficient amount of caesium from the tube 15 up into the cell X, to react with the antimony on the cathode. In preparation for this, the cell X may be placed in an oven R as shown in Fig. 4—with the sealed-off tube 15 extending down through the oven bottom—and heated to a suitably elevated temperature, of the order of some 220° to 260° C., thus bringing the antimony surface at 13 to a temperature at which caesium will rapidly react with it, and also driving any caesium that may have entered the cell X when the charge 19 was flashed down into the tube 15, which remains at room temperature (e. g., 20° C.). The tube 15 may then be heated to vaporize the caesium at 25 and drive it up through the tube 15 and the opening 16 into the cell X, where it deposits on the hot antimony surface of the cathode 13 and at once reacts with the antimony more or less completely. This heating of the tube 15 may be accomplished in a heating zone or enclosure S, which may consist of a separate small oven that can be raised around the tube 15 for the purpose as shown in Fig. 5. Preferably this heating of tube 15 continues long enough to provide a slight surplus of caesium in cell X.

After the tube 15 has been heated in the oven S for the required length of time, the oven S may be removed, to let the tube 15 cool off slightly, whereupon the photocell X may be removed from the oven R and sealed or tipped off from the tube 15 so close that the tip does not project beyond the shelter of the recess in the header 11, as indicated in heavy dotted lines at 27 in Fig. 2. After tipping off, the cells X are baked in an oven (not shown) at a temperature of the order of 180° C. for some 20 minutes, which brings the excess of caesium in each cell X into action as a getter to clean up residual gas, and causes its absorption by internal surfaces of the cell structure. It also tends to stabilize the cells against changes in sensitivity during storage.

In this method, the temperature of the cathode 13 at which the caesium-antimony reaction takes place is controlled by the temperature maintained in the photocell oven R. The higher this temperature, the faster the rate of the reaction; and I have found that rapidity of this reaction is favorable to the desired properties of the photocell X. Premature access of caesium to antimony, when the latter is at a temperature too low for rapid reaction, can be prevented by not heating the tube 15 until the cathode 13 has reached a temperature of rapid reaction. It is desirable that the supply of caesium vapor for the reaction should not be unduly great in relation to the possible rate of reaction; and I prefer that the potential rate of reaction should be faster than the rate at which caesium reaches the cathode 13. The amount of caesium and its rate of supply to the cell X and the antimony surface are controlled by the vapor pressure of caesium in the tube 15, by the distance which the caesium must travel to reach the cathode 13, and by the caliber of the tube 15 and the size of the cell wall opening 16. The vapor pressure of caesium in tube 15 is controlled by the temperature of this tube as determined by that maintained in the tube oven S, provided that this temperature is lower than that in the photocell oven R.

Thus the rate of supply of caesium to the antimony surface at 13 and the rate of the caesium-antimony reaction can be controlled separately and brought into proper relation, so that the reaction proceeds just as fast as the caesium reaches the antimony. The total amount of caesium to react with the antimony depends on how long the tube 15 is heated in the oven S, as well as on the temperature in the oven S: for example, an increase of 20° C. in the temperature of oven S may reduce the required time of heating of the tube 15 in this oven by one-half, other conditions remaining unaltered, of course. By controlling the time or the temperature, or both, the amount of caesium entering the cell can be definitely controlled. It is desirable to introduce a very slight excess of caesium into the cell X, to act as a getter in subsequent operations. Temperatures which experience has shown to be favorable are of the order of 250 to 260° C. for the cathode 13 and 215 to 225° C. for the tube 15, a temperature difference of the order of 25° C. between parts 13 and 15.

Figure 6:
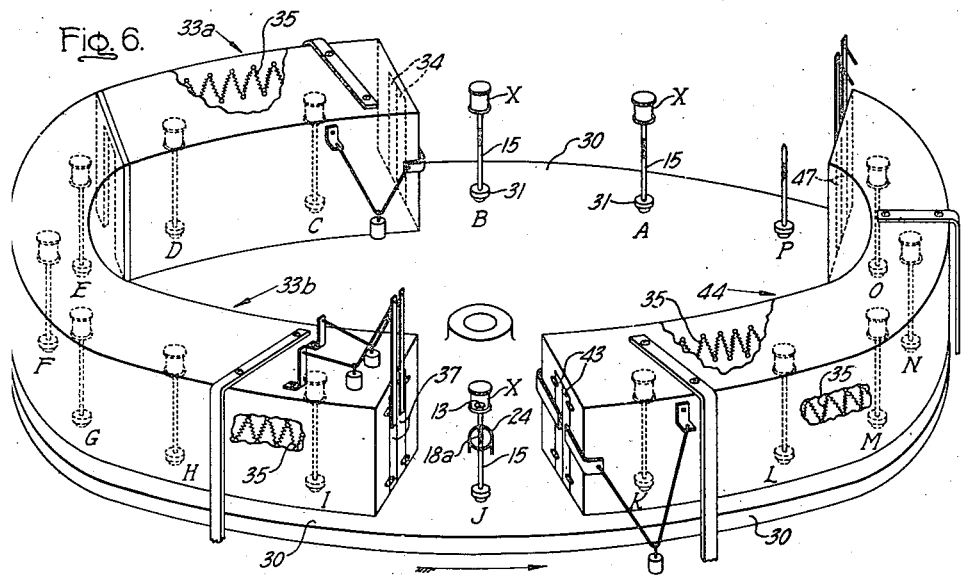
Fig. 6 is a somewhat diagrammatic tilted or perspective view of another apparatus for the practice of the invention, certain parts being partially broken away.

I have devised a way of processing devices according to my invention on a rotary exhaust machine such as used in the manufacture of phototubes according to the old practice hereinbefore described. For this may be used any rotary exhaust machine, such as employed in incandescent lamp manufacture, which can be equipped with ovens as shown in Fig. 6, after removal of any sealing-in means with which it may be provided. Only parts of such a machine that are essential to an understanding of photocell activation according to the invention are shown in Fig. 6.

The machine here illustrated has a rotary carrier or turret 30, which is only sketchily represented, for carrying photocells X around a circular course from a station A where their exhaust tubes 15 are inserted (as by hand) in the socketed exhaust heads 31 of carrier 30 to a station P where the tubes 15 are fused and sealed or tipped off close to the cell head 11, following completion of exhaust and activation during their course of travel. Preferably the motion of the carrier 30 is intermittent or step-by-step, so that each cell pauses for some time at each of the stations A, B, C, D, E, F . . . J . . . M, N, O, P, to afford time for exhausting or otherwise processing it. The exhaust connections to the heads 31 and the drive for the carrier 30 are not shown, since they would obscure features that are of real interest in connection with the inveniton.

After being placed on the carrier 30 at station A and passing station B, the cell X enters an arcuate tunnel-like oven 33 through inward-opening and self-closing double swing-doors 34, 34 which the cell X pushes and holds open while it passes. The oven 33 may be heated by electric resistance heaters 35 suitably mounted on its walls. The oven 33 may have sections 33a, 33b which are distinguished by the maintenance of different temperatures in them. The first oven section 33a is short, including only the two stations C, D, and is maintained at high heat in order to heat up the cells X rapidly. A suitable temperature is of the order of 450° C., as indicated by a thermometer (not shown) when immersed in the oven to a depth of some 2¼ inches. The oven section 33b is longer, including the five stations E, F, G, H, I, and is maintained at a more moderate heat for baking and degassing the cells C during exhaust, a suitable temperature being of the order of 330° C. In the section 33b the cells X are exhausted to a high vacuum.

Emerging from the oven section 33b through outward-opening and self-closing swing-doors 37, 37 essentially similar to the doors 34, 34, each cell X pauses at the station J, where it is neither heated nor specially cooled at all, being simply exposed to the ordinary room atmosphere at some 20° C. or more. Naturally, however, the cell X and its cathode 13 cool less rapidly than the slender tube 15. As soon as the cell X has stopped at position J, a coil 24 of a couple of close turns of flat, stout copper wire located close to the tube 15 below the cell is energized with high-frequency current, thereby heating the capsule 18a in the tube hot enough to flash its caesium-yielding charge, without however materially heating the tube 15 itself or cracking it. A suitable pitch diameter for the coil 24 is about 1 inch; a suitable distance of the coil from the tube 15 is about $\tfrac{1}{16}$ to ⅛ inch; and a suitable position for the capsule 18a in the tube 15 is ½ to ⅝ inch below the cell X. The effect of thus flashing the capsule charge at station J is to drive caesium up into the cell X to deposit on the antimony surface 13, as well as to deposit some caesium on the wall of tube 15 above the capsule 18a, between it and the cell X. Also, the tube 15 is still hot enough, when the capsule is flashed, to vaporize some of the caesium and drive it up into the cell X. The antimony surface 13 being still hotter than tube 15 when the caesium reaches the surface 13, substantially complete reaction of caesium and antimony at once ensues.

After the flashing at station J, the cell X passes through inward-opening swing doors 43, 43 similar to the doors 34, 34 into an arcuate oven 44, which is equipped with heaters 35 similar to those in oven 33, and includes the five stations K, L, M, N, O. This oven 44 is maintained at a heat lower than that in either section of oven 33, so that a thermometer (not shown) immersed in it to a depth of 2¼ inches indicates a temperature of the order of 270° C., while the temperature at the level where the cell X traverses the oven is of the order of 250° to 260° C., and the temperature at the level where the center of the tube 15 travels is of the order of some 215 to 225° C. Thus the cathode 13 is heated to a temperature assuring rapid completion of the reaction between the antimony coating and the deposited caesium, while the deposited caesium in the upper part of the tube 15 is heated to a lower temperature assuring a sufficient but not objectionably excessive additional supply of caesium to the cathode 13.

After emerging from the oven 44 through outward-swinging doors 47, 47 similar to the doors 37, 37, the cell X cools naturally at station P in the room atmosphere, which is at a temperature of some 20° C. or more, and its tube 15 is sealed off short at this station, as by means of sealing gas-burners, not shown. The dwell of the carrier 30 in each position or station A, B, C, etc., may be about 25 seconds, and the time of movement from each position to the next position may be some 5 seconds, together amounting to about half a minute. With the number of carrier positions A, B, C, etc., shown, this will give a suitable length of time for each device in each of the oven sections 33a, 33b, 44, as well as at each position A, B, J, P outside the ovens.

The cells X are afterward baked in an oven (not shown) for some 20 minutes more or less at a temperature of the order of 180° C., to effect gas clean-up and "fix" any excess caesium on the cell walls, as already described.

Figs. 7, 8, and 9 show variant forms of photocell X more or less similar to that illustrated in Figs. 1 and 2.

The variation in Fig. 7 is in effect the cell of Figs. 1 and 2 turned end for end, with the container 18 omitted and with the tube 15 attached or sealed to the anode header 12 around a central opening 16a through the latter, and thus aimed directly toward the center of the cathode disc 13 on the cathode header 11, which is unapertured.

The variation in Fig. 8 has both headers 11, 12 like the cathode header 11 of Figs. 1, 2, 7, and omits the cathode disc 13 altogether. Accordingly, the cathode header 11 is itself coated with antimony and activated with caesium to provide the cathode surface. In addition, the capsule-supporting spring 22 of Figs. 2 and 7 is dispensed with, and the tube 15 is drawn down to a neck 22a slightly smaller than the capsule 18a, thus supporting and positioning the capsule in the tube. The conformation of the lower end of the capsule as shown in Fig. 3 allows passage past it to and through the neck 22a, so that the tube 15 is not blocked.

The variation in Fig. 9 differs from that in Fig. 7 in that the cathode header 11 and disc 13 are replaced by a cathode header 11a whose central inward offset portion 13a is flat and of a diameter corresponding to that of the disc 13 in Figs. 1, 2, 7, and is coated with antimony and activated with caesium to provide the cathode surface.

In Figs. 2 to 9, various parts and features are marked with the same reference characters as corresponding ones in earlier figures, in order to dispense with repetitive description, a distinctive letter being added where such distinction seems desirable.

What I claim as new and desire to secure by Letters Patent of the United States is:

1. A method of treating with alkali metal, in a discharge device, a discharge cathode surface of reactive metal; which method comprises separately controlling the temperature of the cathode at which reaction takes place, and which controls the rate of reaction, and the vapor pressure and rate of supply of alkali metal to react with the reactive metal cathode surface.

2. A method of treating with alkali metal, in a discharge device, a discharge cathode surface of reactive metal; which method comprises heating said cathode surface to a temperature at which reaction between the alkali metal and the reactive metal cathode surface takes place rapidly, and separately heating and vaporizing into said discharge device a supply of the alkali metal from a separate container communicating with said discharge device, at a lower rate than its potential rate of reaction with the reactive metal cathode surface at the temperature of the latter when the alkali metal reaches it.

3. A method of treating with alkali metal, in a discharge device, a discharge cathode surface of reactive metal; which method comprises externally heating said discharge device and its said cathode surface to a temperature at which reaction between the alkali metal and the reactive metal cathode surface takes place rapidly, and separately heating and vaporizing into said discharge device, at a lower temperature and from a separate container communicating with said discharge device, a supply of alkali metal, and thereby driving said alkali metal into said discharge device at a rate less than its potential rate of reaction with the reactive metal cathode surface at the temperature of the latter when the alkali metal reaches it.

4. A method of treating with alkali metal a discharge cathode surface of reactive metal in a discharge device having a tube connected thereto; which method comprises placing in said tube a source of alkali metal supply, exhausting said discharge device and heating the same and its said cathode surface to a temperature at which reaction between the alkali metal and the reactive metal cathode surface takes place rapidly; and while said surface is at such temperature, heating and vaporizing into said discharge device at a lower temperature the alkali metal from said source of supply in said tube.

5. A method of treating with caesium an antimony-surfaced cathode in a photocell having a tube connected thereto, which method comprises placing in said tube, at a spatial interval from said photocell, a metal carrier containing a charge that yields caesium under heat, heating said photocell and its said cathode to a temperature of rapid reaction between caesium and antimony, and, after exhausting said photocell, heating said metal carrier by high-frequency induction and thus liberating caesium therefrom, and also driving the caesium from said tube into the photocell, to react with the antimony surface of said cathode, at a rate less than the rate of potential reaction between the caesium and antimony at the temperature of said cathode surface when the caesium reaches it.

6. A method of treating with alkali metal a discharge cathode surface of reactive metal in a discharge device having a tube connected thereto, which method comprises placing in said tube at a point removed from said discharge device a metal carrier containing a charge which yields alkali metal vapor under heat, exhausting said discharge device and heating the same and its said cathode surface to a temperature at which reaction between the alkali metal and the reactive metal cathode surface takes place rapidly, heating said metal carrier by high frequency induction while cooling said tube, thus liberating alkali metal and depositing the same in the tube between said carrier and said cell, and heating said tube to a lower temperature than said discharge device and thereby vaporizing deposited alkali metal and driving it into said discharge device to react with said reactive metal surface.

7. A method of treating with alkali metal a discharge cathode surface of reactive metal in a discharge device having a tube connected thereto, which method comprises placing in said tube at a point removed from said discharge device a metal carrier containing a charge which yields alkali metal vapor under heat, exhausting said discharge device and heating the same and its said cathode surface to a temperature at which reaction between the alkali metal and the reactive metal cathode surface takes place rapidly, and also heating said tube, and while said surface is at such temperature, and said tube at a temperature sufficient to vaporize the alkali metal, heating said metal carrier by high frequency induction, thus liberating alkali metal in said tube and driving it into said discharge device to react with said reactive metal surface.

CLIFTON G. FOUND.